(12) United States Patent
Singh et al.

(10) Patent No.: US 11,016,477 B2
(45) Date of Patent: *May 25, 2021

(54) DEVICES, METHODS, AND SYSTEMS FOR A DISTRIBUTED RULE BASED AUTOMATED FAULT DETECTION

(71) Applicant: Honeywell International Inc., Morris Plains, NJ (US)

(72) Inventors: Jitendra Singh, Bangalore (IN); Arvind R. Shetty, Bangalore (IN); Rajesh V. Poojary, Bangalore (IN); Manu Taranath, Bangalore (IN); Greg Bernhardt, Hopkins, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,398

(22) Filed: Apr. 8, 2020

(65) Prior Publication Data

US 2020/0241516 A1 Jul. 30, 2020

Related U.S. Application Data

(63) Continuation of application No. 16/192,402, filed on Nov. 15, 2018, now Pat. No. 10,671,061, which is a continuation of application No. 14/883,306, filed on Oct. 14, 2015, now Pat. No. 10,175,686.

(51) Int. Cl.
*G05B 23/02* (2006.01)

(52) U.S. Cl.
CPC .. *G05B 23/0227* (2013.01); *G05B 2219/2642* (2013.01)

(58) Field of Classification Search
CPC ............. G05B 23/0208; G05B 19/042; G05B 23/0227; G06F 19/00; G06F 11/0751
See application file for complete search history.

(56) References Cited

U.S. PATENT DOCUMENTS

| | | | |
|---|---|---|---|
| 7,444,251 B2 | 10/2008 | Nikovski et al. |
| 7,734,400 B2 | 6/2010 | Gayme et al. |
| 8,538,792 B1 | 9/2013 | Kane |
| 8,635,182 B2 | 1/2014 | Mackay |
| 8,788,097 B2 | 7/2014 | Drees et al. |

(Continued)

OTHER PUBLICATIONS

Katipamula, et al., Methods for Fault Detection, Diagnostics and Prognostics for Building System, International Journal of HVAC&R Research, Jan. 2005, vol. 11, No. 1, 24 pp.

(Continued)

*Primary Examiner* — Changhyun Yi
(74) *Attorney, Agent, or Firm* — Seager, Tufte & Wickhem, LLP

(57) ABSTRACT

Devices, methods, and systems for distributed rule based automated fault detection are described herein. One system includes a data extractor engine configured to: extract configuration data relating to an environment based on a number of defined rules, and receive monitored data relating to the environment, an AFD engine configured to evaluate the monitored data in view of the configuration data to determine a state of the environment, and a fault generation engine to determine whether the state of the environment is outside a range defined by the number of defined rules.

19 Claims, 4 Drawing Sheets

(56) References Cited

U.S. PATENT DOCUMENTS

| | | |
|---|---|---|
| 10,175,686 B2* | 1/2019 | Singh .................. G05B 23/0227 |
| 2007/0180324 A1 | 8/2007 | Nakamura |
| 2007/0255442 A1 | 11/2007 | Nakamura et al. |
| 2013/0204948 A1 | 8/2013 | Zeyliger et al. |
| 2013/0318034 A1 | 11/2013 | Bawa et al. |
| 2014/0325292 A1 | 10/2014 | Spivey et al. |

OTHER PUBLICATIONS

Hu, et al., Enhancing Fault Tolerance based on Hadoop Cluster, International Journal of Database Theory and Application, vol. 7, No. 1, 2014, 12 pp.

Fault Detection and Diagnostics, Institute for Building Efficiency, Oct. 2013, 10 pp.

Data-Oriented Tools Available to Facility Managers, SkyFoundry Insider, Issue 17, Aug. 2013, 8 pp.

Brown, Harvest machine data using Hadoop and Hive, IBM DeveloperWorks, Apr. 8, 2014, 12 pp.

* cited by examiner

DEVICES, METHODS, AND SYSTEMS FOR A DISTRIBUTED RULE BASED AUTOMATED FAULT DETECTION

This application is a continuation of co-pending U.S. patent application Ser. No. 16/192,402, filed Nov. 15, 2018, which is a continuation of U.S. patent application Ser. No. 14/883,306, filed Oct. 14, 2015, now U.S. Pat. No. 10,175,686, both of which are incorporated herein by reference.

TECHNICAL FIELD

The present disclosure relates to devices, methods, and systems for a distributed rule based automated fault detection.

BACKGROUND

A building management system (e.g., information building management system (IBMS), heating ventilation air conditioning (HVAC), etc.) can be utilized to monitor, control, and/or maintain a building system. The building management system can be utilized to find equipment faults (e.g., anomalies) within a particular building. The building management system can utilize individual automated fault detection diagnostics (AFDD) to generate reports for each of a plurality of different equipment types within the particular building.

DETAILED DESCRIPTION

Figure 1:
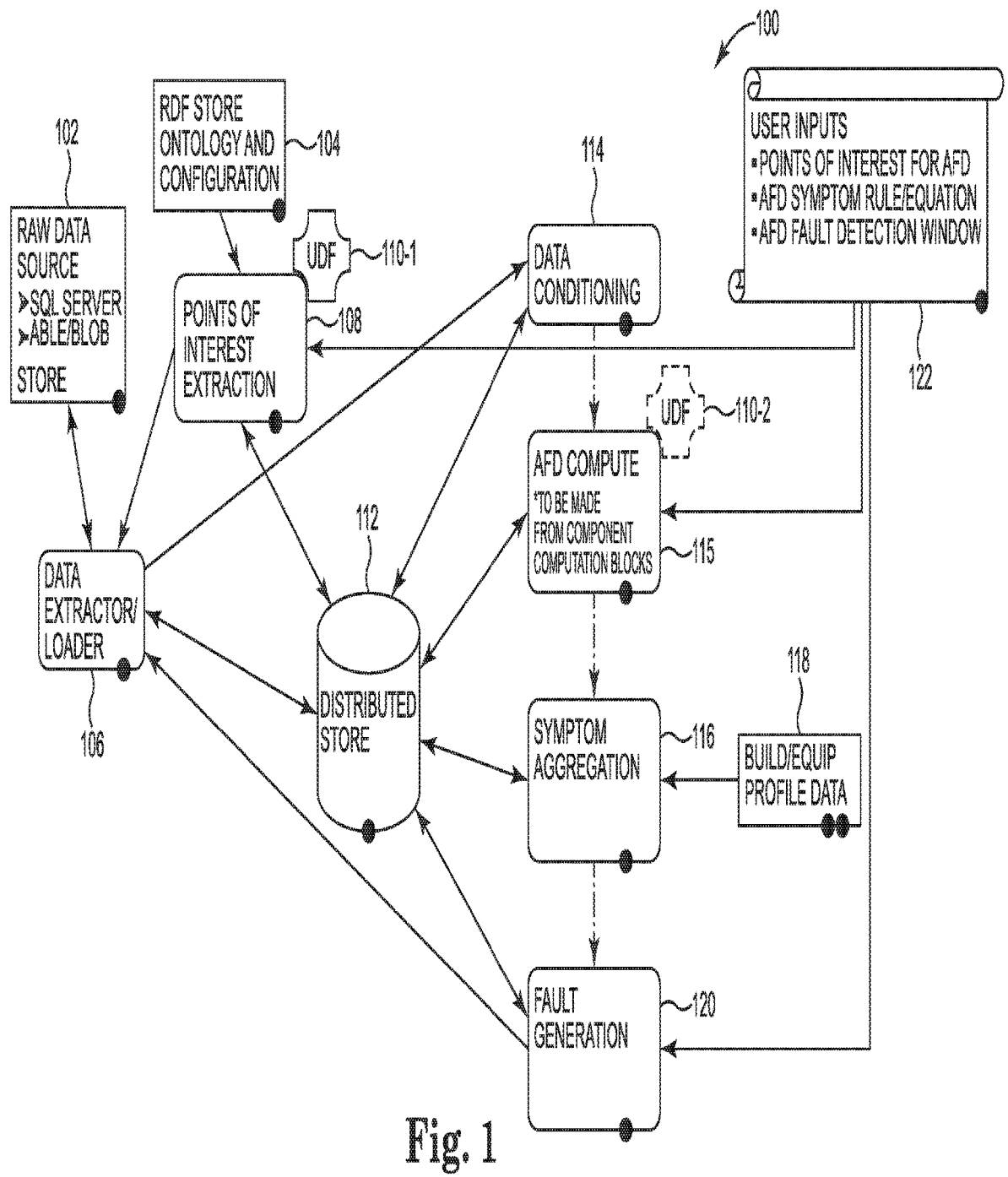
FIG. 1 is an example of a system for a distributed rule based automated fault detection according to one or more embodiments of the present disclosure.

Devices, methods, and systems for a distributed rule based automated fault detection are described herein. For example, one or more embodiments include a data extractor engine configured to: extract configuration data relating to an environment based on a number of defined rules, and receive monitored data relating to the environment, an AFD engine configured to evaluate the monitored data in view of the configuration data to determine a state of the environment, and a fault generation engine to determine whether the state of the environment is outside a range defined by the number of defined rules.

In some examples, the data extractor engine, AFD engine and/or the fault generation engine can be executed by a distributed execution platform that can utilize a distributed store to execute the number of engines. The number of engines can utilize a number of defined rules and/or user inputs to provide automated fault detection for particular systems and/or particular devices within an environment. The environment can include a plurality of individual buildings and/or campuses (e.g., area with multiple buildings, etc.). Each of the individual buildings can include a plurality of different systems and equipment that is associated with the building. For example, each of the individual buildings can include HVAC systems, computing network systems, electrical systems, and/or other systems that can utilize a plurality of equipment.

In previous methods and systems, an individual automated fault detection diagnostics (AFDD) can be utilized to monitor a state and/or detect faults (e.g., malfunctions, potential problems, anomalies, etc.) within each system of a building. The present disclosure describes systems and methods for a distributed rule based automated fault detection of a plurality of different systems and equipment within an environment. In some examples, the systems and methods described herein can be designed to execute on commodity hardware (e.g., existing hardware, etc.) by utilizing a distributed execution platform with a number of executable engines and/or platform blocks to perform a number of functions as described herein.

The distributed rule based automated fault detection systems and methods described herein can be relatively high fault-tolerant and execute on relatively low cost hardware compared to previous systems and methods. In addition, the distributed rule based automated fault detection systems and methods can be utilized with relatively large data sets obtained from a plurality of different locations. For example, the distributed rule based automated fault detection systems and methods can utilize a number of common and reusable platform block based analytical engines that can be managed and/or executed by a distributed store.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

FIG. 1 is an example of a system 100 for a distributed rule based automated fault detection according to one or more embodiments of the present disclosure. The system 100 can be utilized for a distributed rule based automated fault detection. The system 100 can include a raw data source 102 (e.g., Relational Database/Databases, Table/Blob Store, etc.). The raw data source 102 can include memory to store received monitored data relating to equipment within an environment.

In some examples, the raw data source 102 can be a database that can receive monitored data relating to an environment. The environment can include a plurality of buildings and/or campuses where each of the plurality of buildings and/or campuses can include systems and corresponding equipment. For example, each of the buildings and/or campuses can include HVAC systems, communication systems, and/or electrical systems. In this example, the equipment within each of the systems can be monitored and received by the raw data source 102.

The system 100 can also include an RDF store 104. The RDF store 104 can include ontology and configuration data associated with the environment. For example, the RDF store 104 can be a database that can receive and/or store configuration data such as building models, graphical representations of configuration data, building information modeling data, among other information relating to the environment.

The system 100 can include a points of interest extraction engine 108. The points of interest extraction engine 108 can extract data from the RDF store 104 based on a number of user inputs 122. In some examples, the points of interest extraction engine 108 can utilize a user defined function (UDF) engine to receive and utilize the number of user inputs 122. In some examples, the user inputs 122 can include, but is not limited to: points of interest for automated fault detection (AFD), AFD symptom rule and/or equation, and/or an AFD fault detection window, timer period, among other user defined rules.

The points of interest for AFD can include a defined system (e.g., computing network, HVAC system, telephone system, etc.), a number of devices (e.g., air chiller, boiler, server, etc.), specific types of monitored data (e.g., inlet air temperature, outlet air temperature, monitored power, etc.), and/or number of filters to define data to be extracted from the RDF store 104. Thus, specific data can be extracted from the RDF store 104 based on the user inputs 122. The system 100 can include a data extractor/loader 106 that can extract data from the raw data source 102. The data extractor/loader 106 can extract monitored data from the raw data source based on the points of interest extraction engine 108. For example, the user inputs 122 can define specific monitored data to extract from the raw data source 102. In some examples, the specific monitored data can correspond to the data extracted from the RDF store 104. For example, the data extractor/loader 106 can extract monitored data that corresponds to system and/or equipment data extracted from the RDF store 104.

The system 100 can utilize a distributed store 112 (e.g., distributed database management system, etc.) to execute the points of interest extraction engine 108 and/or data extractor/loader 106. The distributed store 112 can be managed by a distributed platform. A distributed platform can include a system where storage devices and/or engines are not all connected to a common processing unit. That is, each of the number of platform blocks 114, 115, 116, 120 can each be executed by a different processor. In addition, the distributed store 112 can execute a number of platform blocks 114, 115, 116, 120. Each of the number of platform blocks 114, 115, 116, 120 can be executed by the distributed store 112 to perform a number of functions. Each of the number of platform blocks 114, 115, 116, 120 can be individually programmed and/or executed by the distributed store 112. For example, the distributed store 112 can manage the number of platform blocks 114, 115, 116, 120 even though the number of platform blocks 114, 115, 116, 120 may not all be connected to a common processor.

The data extracted from the raw data source 102 and the RDF store 104 can be conditioned by the data conditioning block 114. The conditioning block 114 can structure (e.g., organize, format, standardize, etc.) the data from the raw data source 102 for AFD expression and/or AFD execution. For example, the conditioning block 114 can cluster and/or group the data from the raw data source 102 based on an AFD hierarchy and/or point value pivoting.

The conditioned data from the raw data source 102 can be utilized by the AFD compute block 115. The AFD compute block 115 can utilize a user defined function (UDF) engine 110-2 to implement a number of user inputs 122 to generate a number of symptoms for a fault state at a particular time. That is, the AFD compute block 115 can be utilized to define parameters and conditions for a number of states of the environment (e.g., building, campus, plurality of buildings, etc.) associated with the data from the raw data source 102 and/or the RDF store 104. For example, the AFD compute block 115 can be utilized to define when the environment or portions of the environment are in a fault state and/or a non-fault state. For example, the AFD compute block 115 can identify system faults when the data from the raw data source 102 is outside a threshold as defined by the AFD system rule equation defined by the user inputs 122.

The faults that are determined by the AFD compute block 115 can be utilized by the symptom aggregation block 116. The symptom aggregation block 116 can group the determined faults based on a configured AFD fault detection window (e.g., time period of fault detection, etc.). In some examples, the symptom aggregation block 116 can be utilized combine fault points from the AFD compute block 115 over a time period (e.g., work day, 24 hour period, etc.). In some examples, the symptom aggregation 116 can utilize building/equipment profile data 118 for aggregating the determined faults. For example, the building/equipment profile data 118 can be utilized to aggregate determined faults into groups based on the type of equipment that generated the determined faults and/or the system the equipment is associated with that generated the determined faults. Thus, the building/equipment profile data 118 can be utilized to determine relationships between equipment and systems associated with the environment.

The aggregated data from the symptom aggregation block 116 can be utilized by the fault generation block 120. The fault generation block 120 can utilize the aggregated data from the symptom aggregation block 116 to mark a number of continuous fault segments over a time period. The continuous fault segments can be utilized by the fault generation block 116 to determine system faults that may need repair and/or maintenance. In some examples, the fault generation block 120 can generate an output file that includes a description of the number of continuous fault segments over the time period. The description can include a determined fault in a piece of equipment and/or a particular system associated with the environment. Thus, the fault generation block 116 can provide a description of the fault detection results.

The system 100 can be utilized to define AFD rules and other parameters (e.g., weather, time periods, continuous fault segments, etc.). The system 100 can include a number of platform blocks 114, 115, 116, 120 that can be customized and reused for a plurality of different environments. For example, the number of platform blocks 114, 115, 116, 120 can be utilized to analyze different data from a variety of raw data sources and/or RDF stores to provide automated fault detection for each corresponding environment. The system 100 can also provide automated fault detection for relatively large data sets that include data from a plurality of different buildings within an environment.

Figure 2:
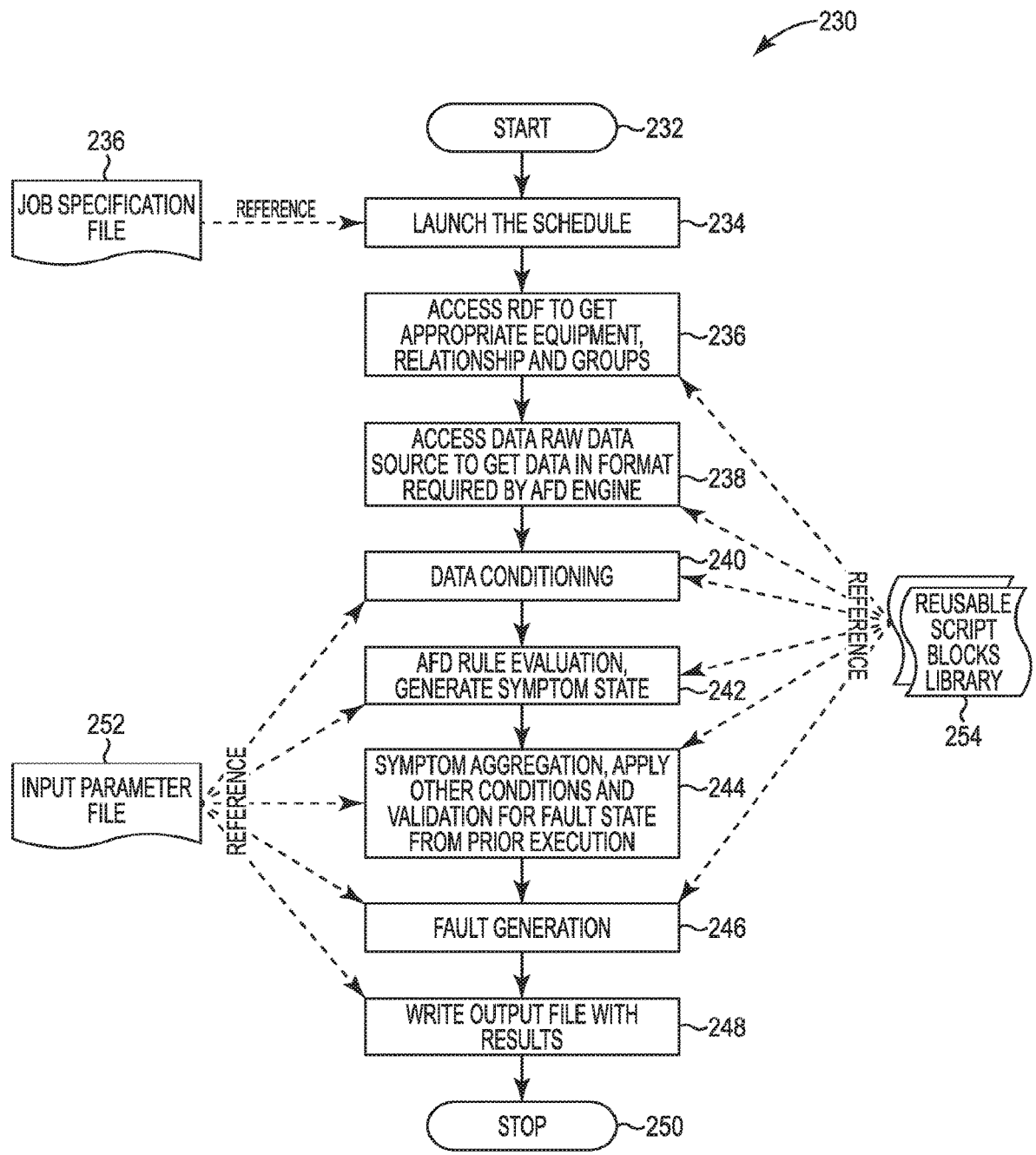
FIG. 2 is an example of a method for a distributed rule based automated fault detection according to one or more embodiments of the present disclosure.

FIG. 2 is an example of a method 230 for a distributed rule based automated fault detection according to one or more embodiments of the present disclosure. The method 230 can be executed by a system similar to system 100 as referenced in FIG. 1 (e.g., distributed platform, etc.). The method 230 can begin at 232.

The method 230 can launch a scheduler (e.g., workflow scheduler, job scheduler, etc.) at 234. The scheduler can be an OOZIE job scheduler and/or other type of job scheduler. The scheduler can utilize a job specification file 236. The job specification file 236 can define a number of engines and/or platform blocks to utilize during the method 230. As used herein a scheduler can manage workflow across a plurality of resources (e.g., memory, processors, etc.). As described herein, the number of engines and/or platform blocks can include software and/or hardware that can be executed by a distributed store (e.g., distributed database, distributed store 112 as referenced in FIG. 1, distributed platform, etc.).

At 236 the method 230 can access RDF (e.g., RDF store 104 as referenced in FIG. 1, etc.) to get appropriate equipment, relationship, and groups from the RDF. As described herein, the RDF can include ontology and configuration data associated with the environment. For example, the RDF can include building models, system schematics, equipment details, and/or equipment relationships of the environment. As described herein, the data extracted from the RDF can be based on a number of user inputs (e.g., points of interest, AFD symptom rules/equations, AFD fault detection window, etc.).

At 238 the method 230 can access data from a raw data source (e.g., raw data source 102 as referenced in FIG. 1, etc.). The data from the raw data source can include monitored data relating to an environment. For example, the data can include monitored temperature data and/or other monitored data corresponding to equipment and/or systems within the environment. In some examples, the data from the raw data source can be extracted based on a number of user inputs and/or based on the data extracted from the RDF.

At 240 the method 230 can include data conditioning. As described herein, the extracted data from the RDF and the raw data source can be conditioned by structuring (e.g., organize, format, etc.) the data from the raw data source for AFD expression and/or AFD execution. Thus, the conditioning can prepare the data for execution.

At 242 the method 230 can include an AFD rule evaluation and generating a symptom state (e.g., state of the environment, state of equipment, etc.) based on the AFD rule evaluation. The AFD rule evaluation can be a user defined evaluation of the conditioned data. The evaluation can be utilized to determine a number of faults within an environment. Based on a number of determined faults, a symptom state of a system within the environment and/or the environment can be generated. The symptom state can be a representation of a functionality of the environment. For example, the symptom state can define systems and/or equipment that have a number of faults.

At 244 the method 230 can include symptom aggregation, applying other conditions, and/or validation for fault state from prior execution. As described herein, the symptom aggregation can combine a number of determined faults within the environment for a period of time. For example, the symptom aggregation can combine the determined symptom state for a particular day. In some examples, a number of other conditions can be applied to the symptom aggregation. The number of other conditions can include, but are not limited to: weather conditions, occupancy conditions, event condition, among other conditions that can affect the symptom state. The number of other conditions can be utilized to determine if a fault state would exist under a variety of different conditions, even when a fault state does not exist under current conditions.

The method 230 can include validation for fault state from prior execution of the method 230. For example, the fault state can be compared to previous fault states that were determined by prior executions of the method 230. That is, a fault state can be compared to previous fault states for a number of different time periods to validate the existence of a fault state. In some examples, results of a physical inspection of the equipment or system that caused a determined fault state when method 230 was previously executed can be utilized to determine the existence of a currently determined fault state.

At 246 the method 230 can include fault generation. As described herein, the fault generation can include marking a number of continuous fault segments over a time period. The continuous fault segments can be utilized to determine system faults that may need repair and/or maintenance. The fault generation can be based on user inputs as described herein.

At 248 the method 230 can include writing output file with results. Writing the output file can include generating an output file with identified system faults within the environment. In some examples, the identified system faults can be system faults that are validated and/or outside a threshold value (e.g., continuous fault segments for a particular period of time, etc.).

The method 230 can utilize a number of input parameter files 252 and/or reusable script blocks library to execute steps 236-248. The input parameter files 252 can include user inputs that can be utilized to define points of interest for the AFD and/or other conditions that can affect the AFD. In some examples, the reusable script blocks library 254 can include a number of engines and/or platform blocks as described herein to execute the method 230.

Figure 3:
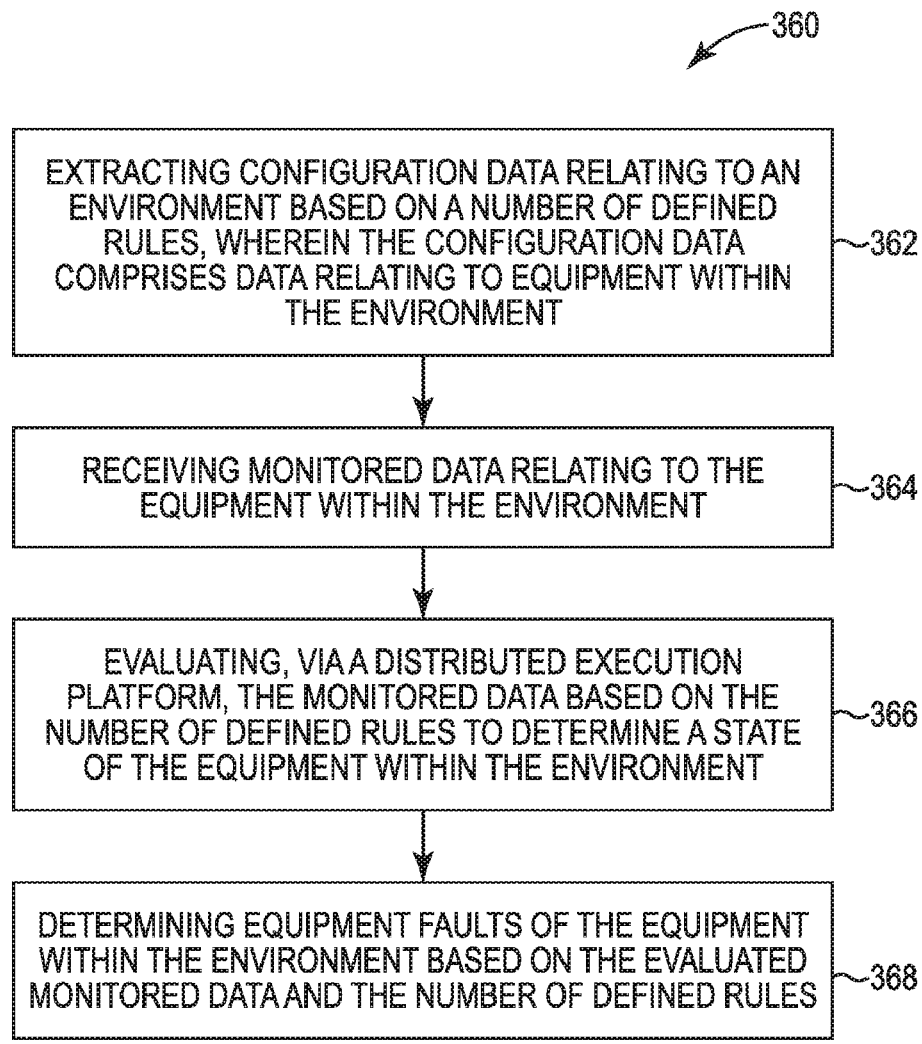
FIG. 3 is an example of a method for a distributed rule based automated fault detection according to one or more embodiments of the present disclosure.

FIG. 3 is an example of a method 360 for a distributed rule based automated fault detection according to one or more embodiments of the present disclosure. The method 360 can be executed by a number of engines and/or platform blocks as described herein. In some examples, the method 360 is executed on a distributed platform (e.g., system 100 as referenced in FIG. 1). For example, the method 360 can include initializing a number of environmental components with functionality described herein (e.g., distributed store, model store, user inputs, etc.) and providing domain modules and AFD rules while using reusable instruction blocks (e.g., code blocks) as inputs for a scheduler or orchestrator.

At 362 the method 360 can include extracting configuration data relating to an environment based on a number of defined rules, wherein the configuration data comprises data relating to equipment within the environment. Extracting configuration data can include extracting ontology and configuration data from an RDF store as described herein. The configuration data can include, but is not limited to: blueprints, equipment configuration data, building information (BIM) data, and/or other data relating to systems and equipment within the environment.

In some examples, extracting the configuration data can be based on a number of define rules and/or user inputs. The defined rules and/or user inputs can define points of interest for AFD. For example, the defined rules can define particular systems and/or equipment within systems within the environment.

At 364 the method 360 can include receiving monitored data relating to the equipment within the environment. Receiving monitored data relating to the equipment within the environment can include extracting data from a raw data source as described herein. The monitored data can be stored in a raw data source and can be extracted or received based on the configuration data that is extracted. For example, configuration data of an HVAC system for an environment that includes a plurality of buildings can be extracted and the monitored data that is extracted can relate to equipment within the HVAC system for the environment. Even when the raw data source includes data relating to other systems within the environment, the method 360 can receive only monitored data that relates to the configuration data that has been extracted.

At 366 the method 360 can include evaluating, via a distributed execution platform, the monitored data based on the number of defined rules to determine a state of the equipment within the environment. Evaluating the monitored data can include AFD rule evaluation and symptom state generation as described herein. For example, evaluation the monitored data can include generating symptom state of the equipment within the environment and/or generating a symptom state of the environment. The evaluation of the monitored data can include determining a number of continuous fault segments from aggregated data as described herein.

The symptom state can be a representation of how a system or equipment within the system is functioning. For example, a fault can correspond to a system or equipment within the system functioning outside of a threshold. For example, a chiller of an HVAC system can have a symptom state that includes a fault when the chiller is operating at a temperature that is outside of a threshold value. In some examples, the threshold values can be based on the number of defined rules and/or user inputs as described herein.

At 368 the method 360 can include determining equipment faults of the equipment within the environment based on the evaluated monitored data and the number of defined rules. Determining equipment faults can include aggregating the symptom states that were previously determined. The aggregated symptom states can be utilized to determine if there is a number of continuous fault segments that are greater than a defined threshold. In some examples, the defined threshold can be defined by the number of defined rules and/or a number of user inputs.

Figure 4:
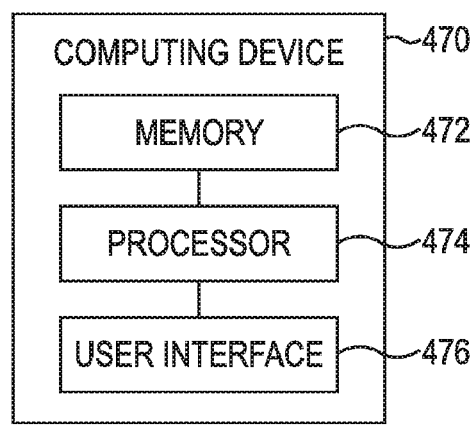
FIG. 4 is an example of a computing system for a distributed rule based automated fault detection according to one or more embodiments of the present disclosure.

FIG. 4 is an example of a computing system for a distributed rule based automated fault detection according to one or more embodiments of the present disclosure. Computing device 470 can be, for example, a commodity server, a data center that comprises a plurality of servers, among other types of computing devices or embedded system. Computing device 470 can be utilized in system 100, and/or methods 230 and 360 to perform the functions previously described herein. For example, computing device 470 can be included in a data extractor (e.g., data extractor/loader 106, etc.) to extract monitored data from a raw data source (e.g., raw data source 102, etc.).

As shown in FIG. 4, computing device 470 includes a memory 472 and a processing resource 474 (e.g., processor) coupled to memory 472. Memory 472 can be any type of storage medium that can be accessed by processing resource 474 to perform various examples of the present disclosure. For example, memory 472 can be a non-transitory computer readable medium having computer readable instructions (e.g., computer program instructions) stored thereon that are executable by processing resource 474 to perform localizing a fault on a live cable in accordance with one or more embodiments of the present disclosure.

Memory 472 can be volatile or nonvolatile memory. Memory 472 can also be removable (e.g., portable) memory, or non-removable (e.g., internal) memory. For example, memory 472 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 472 is illustrated as being located in computing device 470, embodiments of the present disclosure are not so limited. For example, memory 472 can also be located internal to another computing resource (e.g., enabling computer readable instructions to be downloaded over the Internet or another wired or wireless connection).

As shown in FIG. 4, computing device 470 can also include a user interface 476. User interface 476 can include, for example, a display (e.g., a screen). The display can be, for instance, a touch-screen (e.g., the display can include touch-screen capabilities). User interface 476 (e.g., the display of user interface 476) can provide (e.g., display and/or present) information to a user of computing device 470.

Additionally, computing device 470 can receive information from the user of computing device 470 through an interaction with the user via user interface 476. For example, computing device 470 (e.g., the display of user interface 476) can receive input from the user via user interface 476. The user can enter the input into computing device 470 using, for instance, a mouse and/or keyboard associated with computing device 470, or by touching the display of user interface 476 in embodiments in which the display includes touch-screen capabilities (e.g., embodiments in which the display is a touch screen).

As used herein, "a" or "a number of" something can refer to one or more such things. For example, "a number of resources" can refer to one or more resources. Additionally, the designator "N", as used herein, particularly with respect to reference numerals in the drawings, indicates that a number of the particular feature so designated can be included with a number of embodiments of the present disclosure.

As described herein, a "module" can include computer readable instructions that can be executed by a processing resource to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for fault detection in a building management system that includes equipment operating in an environment, the method comprising:
    collecting data from equipment of the building management system, wherein the collected data is based on an ontology of the equipment within the environment and on one or more points of interest specified by a user;
    conditioning the collected data;
    determining equipment faults based on the conditioned collected data;
    aggregating equipment faults into groups of faults based on a type of equipment that generated the faults;
    generating a fault description for at least some of the faults; and
    reporting at least some of the faults with the corresponding fault description.

2. The method of claim 1, wherein the collected data is conditioned by structuring the collected data for use by a fault detection engine that determines one or more of the equipment faults based on the conditioned collected data.

3. The method of claim 1, wherein one or more of the equipment faults are determined based on the conditioned collected data and one or more rules defined by the user.

4. The method of claim 3, wherein the one or more rules defined by the user are stored in a reusable library.

5. The method of claim 1, wherein the equipment faults are aggregated into groups based on a fault detection window defined by the user.

6. The method of claim 1, wherein aggregating equipment faults into groups comprises marking a number of continuous faults over a time period.

7. The method of claim 1, wherein the fault description for at least some of the faults identifies a particular piece of equipment that is associated with the fault.

8. A non-transitory computer readable medium having computer readable instructions stored thereon that are executable by a processor to:
    collect data corresponding to equipment within an environment;
    determine one or more equipment faults based on the collected data;
    aggregate determined equipment faults into groups of faults based on a type of equipment that generated the determined equipment faults;
    generate a fault description for at least some of the equipment faults; and
    report at least some of the equipment faults with the corresponding fault description.

9. The non-transitory computer readable medium of claim 8, wherein the collected data is collected based on one or more points of interest specified by a user.

10. The non-transitory computer readable medium of claim 9, wherein the collected data is based on an ontology of the equipment within the environment and on the one or more points of interest specified by the user.

11. The non-transitory computer readable medium of claim 8, wherein the collected data is conditioned before determining one or more equipment faults based on the collected data.

12. The non-transitory computer readable medium of claim 11, wherein the collected data is conditioned by structuring the collected data for use by a fault detection engine that determines one or more equipment faults based on the conditioned collected data.

13. The non-transitory computer readable medium of claim 8, wherein the one or more equipment faults are determined based on the collected data and one or more rules defined by a user.

14. The non-transitory computer readable medium of claim 13, wherein the one or more rules defined by the user are stored in a reusable library.

15. The non-transitory computer readable medium of claim 8, wherein determined equipment faults are aggregated into groups based on a fault detection window defined by a user.

16. The non-transitory computer readable medium of claim 8, wherein determined equipment faults are aggregated into groups by marking a number of continuous faults over a time period.

17. The non-transitory computer readable medium of claim 8, wherein the fault description for at least some of the faults identifies a particular piece of equipment that is associated with the fault.

18. A system for fault detection in a building management system that includes equipment operating in an environment, the system comprising:
    a data collector, the data collector collecting data from equipment of the building management system, wherein the collected data is based on an ontology of the equipment within the environment and on one or more points of interest specified by a user;
    a data conditioner, the data conditioner conditioning the collected data;
    a fault detector, the fault detector determining one or more equipment faults based on the conditioned collected data;
    an aggregator, the aggregator aggregating equipment faults into groups of faults based on a type of equipment that generated the faults;
    a fault description generator, the fault description generator generating a fault description for at least some of the equipment faults; and
    a reporter, the reporter reporting at least some of the equipment faults with the corresponding fault description.

19. The system of claim 18, wherein the aggregator aggregates equipment faults into groups based on a fault detection window defined by the user.

* * * * *